July 7, 1925.
H. F. SMITH
1,544,950
GAS PURIFICATION
Filed July 5, 1921
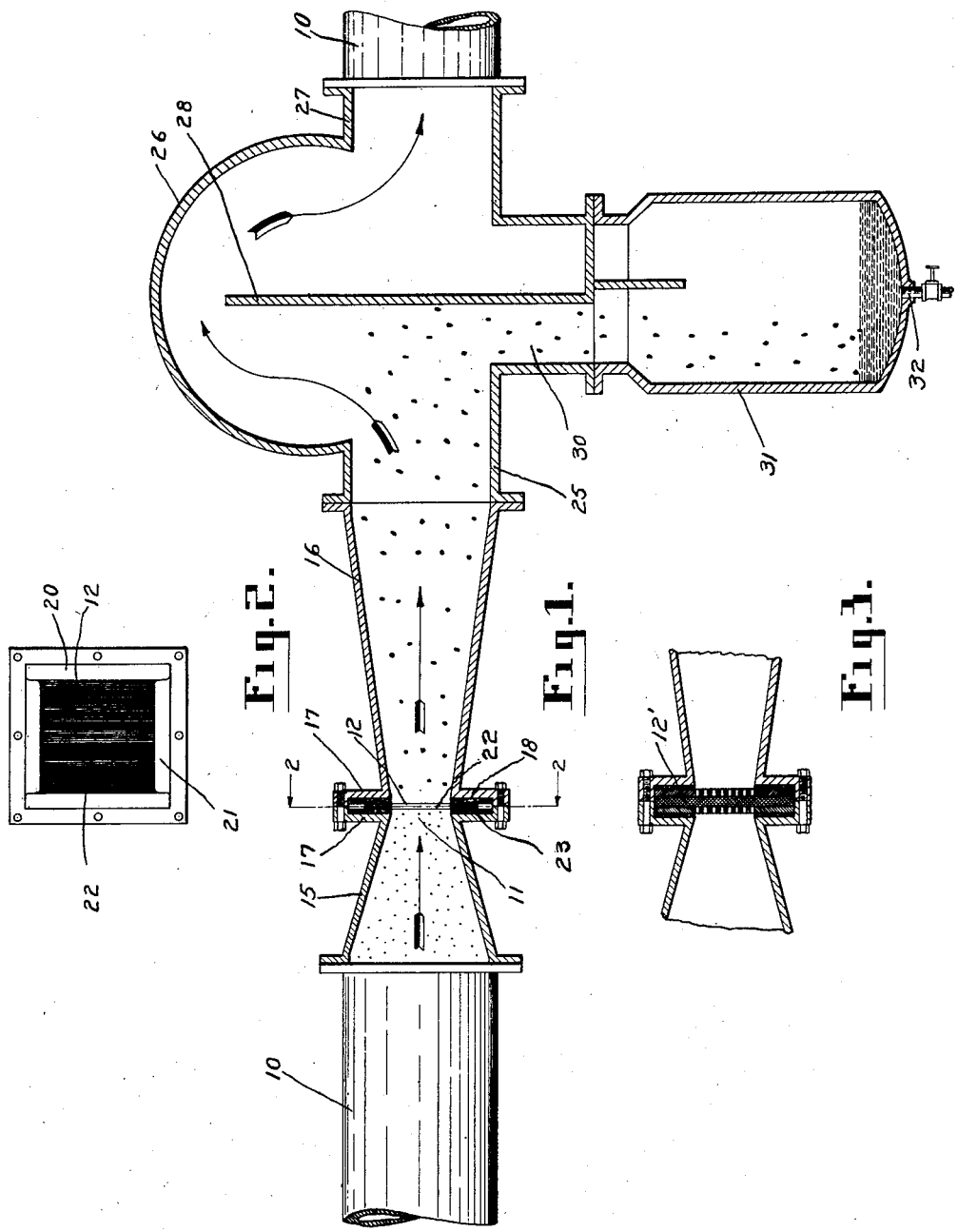
Witnesses
Edmund C. Sylvia
Charles E. Greene
Inventor
Harry F. Smith
By
Attorney Patented July 7, 1925.

1,544,950

UNITED STATES PATENT OFFICE.

HARRY F. SMITH, OF DAYTON, OHIO, ASSIGNOR TO THE GAS RESEARCH COMPANY, OF DAYTON, OHIO, A CORPORATION OF OHIO.

GAS PURIFICATION.

Application filed July 5, 1921. Serial No. 482,486.

*To all whom it may concern:*

Be it known that I, HARRY F. SMITH, a citizen of the United States of America, residing at Dayton, county of Montgomery, and State of Ohio, have invented certain new and useful Improvements in Gas Purification, of which the following is a full, clear, and exact description.

This invention relates to gas purification and more particularly to an improved form of apparatus for removing impurities, such as tar, from gas.

In the patent issued to Harry F. Smith Number 1,140,198 dated May 19, 1915, is described a method of removing impurities from gases and a form of apparatus for carrying that method into effect. One object of the present invention is to provide another form of apparatus for carrying out the method of gas purification referred to in the above patent.

Other objects and advantages will be apparent from the description set out below when taken in connection with the accompanying drawing.

In the drawing,

Fig. 1 shows a view, in section, of a form of purifying apparatus embodying the invention;

Fig. 2 shows a sectional view along line 2—2 of Fig. 1; and

Fig. 3 shows a purifying apparatus having a different type of diaphragm.

As set out in the above referred to patent, and also in the patent to Harry F. Smith No. 1,379,056, issued May 24, 1921, impurities, such as tar, contained within a gas may be removed therefrom by passing the gas, at a suitable velocity, through a pervious diaphragm, or pad, preferably of spun glass, the very fine particles of impurity within the gas becoming agglomerated into drops of such substantial size, while passing through the pervious diaphragm, that they will drop out under the action of gravity when the velocity of flow of the gas is slowed down. In the present invention this same general method of purification is carried out.

As brought out most clearly in Patent No. 1,379,056, above referred to, the effectiveness of the cleaning operation, for a given type of diaphragm, is dependent upon the velocity of flow of the gas within the pervious diaphragm. If the velocity is increased the impurities are more completely removed from the gas. This increased velocity of flow, in the structures shown in the patents referred to, will result when the differential pressure across the diaphragm increases, and this in turn is accompanied by the expenditure of greater power for forcing the gas through the diaphragm. Therefore there is, with these forms of cleaning apparatus, a certain velocity of flow which represents maximum efficiency. Any increase in the velocity of flow beyond this point will give an increase in cleaning effectiveness at a disproportionate expenditure of power, while a decrease in the velocity of flow below this point will give a decrease in the cleaning effectiveness which is disproportionate to the power saving. In this invention the apparatus is so constructed that the velocity of flow of the gas within the pervious diaphragm is maintained high without the expenditure of excessive power. In this apparatus the pervious diaphragm is housed within a Venturi tube by means of which the pressure of the gas in the main is translated into velocity as it approaches and passes through the diaphragm, so that the desired velocity of flow of the gas is attained without the building up of excessive pressures in advance of the diaphragm, that is, without the expenditure of excessive power.

In the present invention the gas to be cleaned is led, under pressure, through the pipe 10, to which is connected one end of the purifier housing. This housing as shown consists of a Venturi tube, designated generally by the numeral 11, a pervious diaphragm or pad designated generally by the numeral 12 being positioned transversely of the passage within the Venturi tube, and at substantially the place of minimum diameter of that tube. This Venturi tube may, if desired, be a single unitary structure but for easier manufacture, assembly and maintenance, it is shown as composed of two sections 15 and 16, one end of each of these sections being provided with a suitable flange, or other means, for attachment to the cooperating part of the apparatus. The other end of each of these sections is provided with an outstanding flange 17, these flanges being constructed for cooperation with each other. The cooperating faces of these flanges are recessed, as at 18, to receive, and house, the pervious diaphragm 12. This diaphragm may be of the type illustrated in the above referred to patents, and is preferably of some filamentous or fibrous material. A pad of very fine spun glass will function very satisfactorily, for example.

The pervious diaphragm 12, however, is illustrated as being composed of a plurality of fine, closely spaced, wires or filaments. These wires or filaments may be of metal, or spun glass, of hair or of any other analogous material. This filamentous material is shown as wound about a bobbin or holder 20, having the edge cut away, as at 21, to facilitate holding the filaments in assembled position. The holder 20 is also provided with a port 22 therethrough which corresponds in size and shape with the passage through the Venturi tube 11. The filaments are so arranged as to form two spaced layers, located upon opposite sides of the holder 20, and so positioned, when the device is assembled, that the gas passing through the Venturi tube must also pass through and in intimate contact with these filaments. The holder 20 is so proportioned that it may be readily received within the space formed by the recess in the flanges 17, these recesses being sufficiently deep when the two flanges are in cooperative relation to also receive suitable packing material 23 adapted to hold the member 20 in assembled position, and to also prevent leakage of gas through the device or around the filamentous diaphragm, at this point.

The member 15 of the Venturi tube is attached to the delivery pipe 10 while the member 16 is attached to the inlet 25 of a fitting or separator designated generally by the numeral 26, the outlet 27 of this separator being connected to the other section of the delivery main 10. The fitting 26 has a baffle 28 located therein, intermediate the inlet opening 25 and outlet opening 27, and the fitting is so proportioned that the gas, as it passes thereinto from the Venturi tube 11, will have its velocity very materially decreased.

The fitting 26 is also provided with a passage 30, connected to that part of the fitting in advance of the baffle 28, a tar collecting tank or sump 31 being connected to this passage 30.

As the gas passes through the delivery main 10, under pressure, into the inlet end 15 of the Venturi 11 its velocity will be increased without any increase in the pressure in advance of the diaphragm, that is, without any corresponding increase in the power input necessary for moving the gas through the apparatus. As this rapidly moving gas, which carries therein particles of impurity, such as tar fog passes through the diaphragm 12 the particles of impurity will be caused to agglomerate into drops of substantial size, which will be carried by the gas through the diaphragm, and, because of the velocity of the gas within the Venturi tube, will be carried along by the gas as it passes out of the Venturi. As the gas passes into the fitting 26, its velocity will be very materially decreased. Further, its direction will be abruptly changed on account of the baffle 28 located within this fitting. Consequently the drops of impurity will settle from the gas through the action of gravity and will pass into the sump 31.

An opening 32, is located in the bottom of the sump, to which may be connected a drain pipe, provided, if desired, with any suitable means for pumping the tar from the sump.

And in Fig. 3 is shown a slightly modified form of apparatus. In this modification the pervious diaphragm consists of a pad or mat 12' of finely spun glass wool. This mat is of the same character as described in the above referred to application and the operation of the device, in the removal of impurities from the gas, is exactly the same in principle and in practice as the operation of the device illustrated in Figs. 1 and 2 and described above.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. In apparatus for purifying gases, a Venturi tube, through which the gas to be purified is passed, a pervious diaphragm within said tube, within which diaphragm the impurities carried by the gas are caused to agglomerate into particles of substantial size; and means associated with the outlet end of the Venturi tube for removing such agglomerated particles from the gas.

2. In apparatus for purifying gases, the combination of a main through which gas to be cleaned is passed, a Venturi tube having one end connected to said main, a pervious diaphragm within said tube through which the gas is passed, the impurities in the gas being agglomerated, as the gas passes through said diaphragm, into particles of substantial size and carried out of the diaphragm by the current of flowing gases; a separator connected to the outlet end of said Venturi tube, for removing the agglomerated particles from the gas, and a delivery main connected to the separator.

3. In gas cleaning apparatus, the combination with a main, through which gas to be cleaned is passed; of a Venturi tube made in two sections, means at one end of each section for attaching said section to the said main, an outstanding flange at the other end of each section for cooperating with the corresponding flange on the other Venturi section, each of said flanges having a recess therein, the two recesses, when the sections of the Venturi are in assembled position constituting a pocket; a bobbin positioned within the said pocket in the flanged ends of the Venturi section, having a centrally arranged opening therein for registration with the passage through the venturi, a filament wound about said bobbin to form a pervious diaphragm across the passage through the Venturi tube; packing material positioned within the said pocket on each side of the bobbin; and means for clamping the cooperating flanges of the two sections of the Venturi tube together.

In testimony whereof I hereto affix my signature.

HARRY F. SMITH.

Witnesses:
HERMAN G. DUERR,
CHARLES C. GREENE.